Jan. 5, 1932.  F. HODGKINSON  1,839,850

METHOD OF BOLTING TURBINE CASINGS

Original Filed May 29, 1928

WITNESS
E. Lutz

INVENTOR
F. Hodgkinson
BY
A. B. Reavis
ATTORNEY

Patented Jan. 5, 1932

1,839,850

UNITED STATES PATENT OFFICE

FRANCIS HODGKINSON, OF PHILADELPHIA, PENNSYLVANIA, ASSIGNOR TO WESTING-HOUSE ELECTRIC & MANUFACTURING COMPANY, A CORPORATION OF PENNSYLVANIA

METHOD OF BOLTING TURBINE CASINGS

Original application filed May 29, 1928, Serial No. 281,526. Divided and this application filed April 18, 1930. Serial No. 445,491.

This application is a division of application, Serial No. 281,526, filed May 29, 1928, which in turn is a division of application, Serial No. 32,150, filed May 22, 1925, (since issued as Patent No. 1,682,338, August 28, 1928).

My invention relates to a method of bolting together parts having registering bolt openings, for example, the parts of an elastic fluid turbine, and it has for its object to provide a more efficient method of bolting.

More particularly, the object is to provide a method of bolting whereby the maximum holding power may be obtained from a given set of bolts.

Modern elastic fluid turbines are being designed to operate at increasingly higher pressures. This means that the parts of the turbine casing are subjected to much greater forces tending to force the same apart, requiring much greater holding power of the bolts which secure the casing parts together.

In accordance with my invention, I tighten the bolts uniformly to provide maximum holding power of each bolt. I accomplish this by providing bolts which are hollow for the major portion of the length thereof for the accommodation of heating means, and which have accurately machined surfaces at the ends whereby their lengths may be measured. The bolts are inserted in the casing bolt openings and nuts are placed thereon. The lengths of the bolts are measured. Suitable heating means are then placed within the holes in the bolts, and the nuts are tightened by an amount estimated to provide the stretch of the bolts corresponding to a predetermined stress on the material of the bolt. After allowing the bolts to cool, the lengths are again measured to determine if they have been stretched the desired amount.

Figure 1:
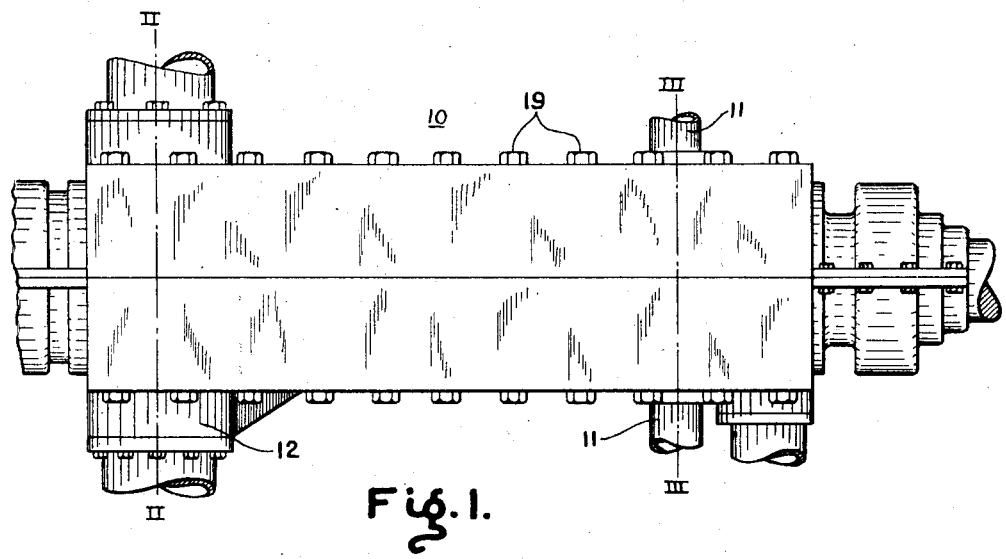
Figure 2:
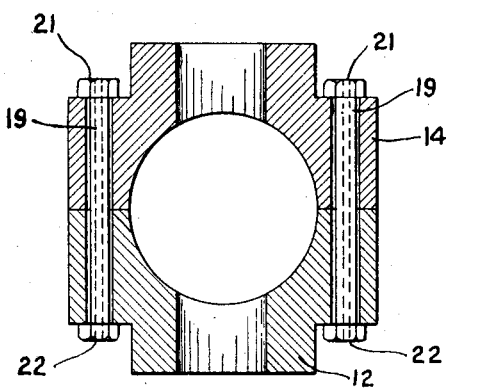
Figure 3:
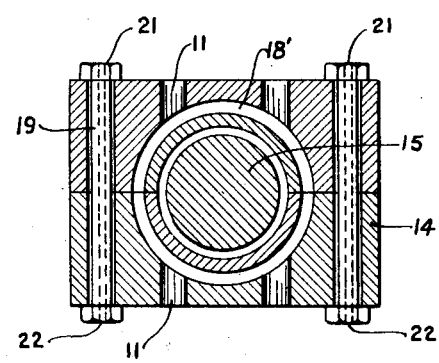
Figure 4:
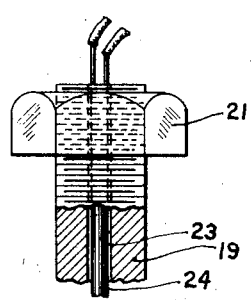

The above and other objects are effected by my invention, as will be apparent from the following description and claims taken in connection with the accompanying drawings forming a part of this application, in which:

Fig. 1 is a view in elevation showing a turbine made in accordance with my invention;

Figs. 2 and 3 are transverse sectional views taken through the turbine casing along the lines II—II and III—III, respectively, of Fig. 1, said sections being at the exhaust outlet and motive fluid inlet, respectively, but off-set at the sides to show the bolt holes and the bolts in the casing; and, Fig. 4 is a sectional view, of a bolt employed in holding the parts of the turbine casing together and including a heating element employed in accordance with my invention.

Referring now to the drawings for a more detailed description of my invention, I show, in Fig. 1, my improved turbine provided with motive fluid inlets 11—11 and with an exhaust outlet 12. Referring to Figs. 2 and 3, the turbine 10 embodies a casing or a cylinder 14 which is formed from two blocks of forged steel of approximately rectangular form, the blocks being bored out to form the cylinder in which the rotor 15 is disposed. At 18' I show a nozzle chamber communicating with the inlets 11—11.

The two halves of a casing 14 are held together by means of relatively long bolts 19—19, such bolts being provided at the top with nuts 21—21 and at the bottom with nuts 22—22, the nuts 21 and 22 being screwed down tightly in order to hold the two halves together and to withstand the high pressure employed in the turbine. As these bolts are necessarily large, I have found them difficult to tighten with assurance of imposing thereupon definite stresses.

In order to more firmly secure the halves of the casing together, I provide means for heating the bolts 19 before the nuts 21 and 22 are tightened thereon, and also means for measuring the stretch of the bolts in order that a definite and uniform stress may be placed thereon. To this end, each bolt is provided with a hole 23 extending longitudinally therethrough, preferably centrally of the bolt and from end-to-end, and with plane surfaces accurately machined on the ends thereof.

Each bolt is tightened and the stretch thereof determined in the following manner: Micrometer measurements of the length of the bolt are made by applying a micrometer to the plane surfaces on the ends. A heating element, for example, an electric heating element 24, is placed within the hole 23, as shown in Fig. 5, and an electrical current is passed through it until the bolt is sufficiently heated. It is to be understood that any other suitable source of heat may be applied through the hole 23.

One or both of the nuts 21 and 22 are turned a sufficient amount to provide the desired stretch. The amount that the nuts must be turned can readily be estimated, since the physical characteristics of the bolt material and the pitch of the thread are known.

After the nuts are tightened by being turned the correct amount, the bolt is allowed to cool, and the length of the bolt is again measured to check the stretch. If it has not been stretched the proper amount to provide the desired stress, the bolt is again heated and one or both of the nuts 21 and 22 turned to correct the amount of stretch. After cooling, the stretch may again be checked.

As noted above, the stress imposed by the bolts, which is the force with which the bolts hold the halves of the casing together, is determined from the amount of stretch. By uniformly stressing the bolts, the casing parts are evenly secured together and the possibility of leakage minimized.

From the above description, it will be apparent that I have invented an improved method of bolting the parts of a turbine together whereby the maximum holding power of the bolts is utilized to hold the turbine parts together. Since the stresses imposed on the bolts and with which the bolts hold the turbine parts together are definitely determined, it is possible to take full advantage of the maximum holding power of the bolts. I am enabled, therefore, to obtain maximum holding power from a set of bolts of given size and number.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. The method of bolting together parts having registering bolt openings, which comprises inserting through said registering openings bolts having holes extending longitudinally therein, placing nuts on said bolts, inserting heating means in the holes in the bolts and heating said bolts, and tightening the nuts on the bolts while the latter are heated.

2. The method of bolting together parts having registering bolt openings, which comprises inserting through said registering openings bolts having holes extending longitudinally therein, placing nuts on said bolts, inserting heating means in the holes in the bolts and heating said bolts, and then tightening said nuts on the bolts to provide a definite stretch of said bolts.

3. The method of bolting together parts having registering bolt openings, which comprises inserting through said registering openings bolts having holes extending longitudinally therein, placing nuts on said bolts, measuring the lengths of said bolts, inserting heating means in the holes in the bolts and heating said bolts, then tightening said nuts on the bolts to provide a definite stretch of said bolts while the latter are heated, allowing the bolts to cool, and then measuring the lengths of said bolts when the same are again at substantially the temperature at which they were first measured.

4. The method of bolting together parts by a plurality of bolts so that the latter will be stressed substantially uniformly which consists in providing hollow bolts inserted in openings of the parts to be connected, tightening the nuts of the bolts, measuring the lengths of the bolts, inserting heating means in the bolts to heat the latter, tightening the nuts of the bolts in heated condition, allowing the bolts to cool, and then again measuring the bolts, said steps of heating and tightening being carried to an extent such that the first and second measurements will show such elongations as to provide the desired substantially uniform state of stress.

In testimony whereof, I have hereunto subscribed my name this 15th day of April, 1930.

FRANCIS HODGKINSON.